Oct. 23, 1945.    W. S. PRAEG    2,387,679
GEAR SHAVING MACHINE
Filed March 16, 1942    5 Sheets-Sheet 1

INVENTOR.
WALTER S. PRAEG
BY
ATTORNEYS

Oct. 23, 1945.  W. S. PRAEG  2,387,679
GEAR SHAVING MACHINE
Filed March 16, 1942  5 Sheets-Sheet 2

INVENTOR.
WALTER S. PRAEG
BY 
ATTORNEYS

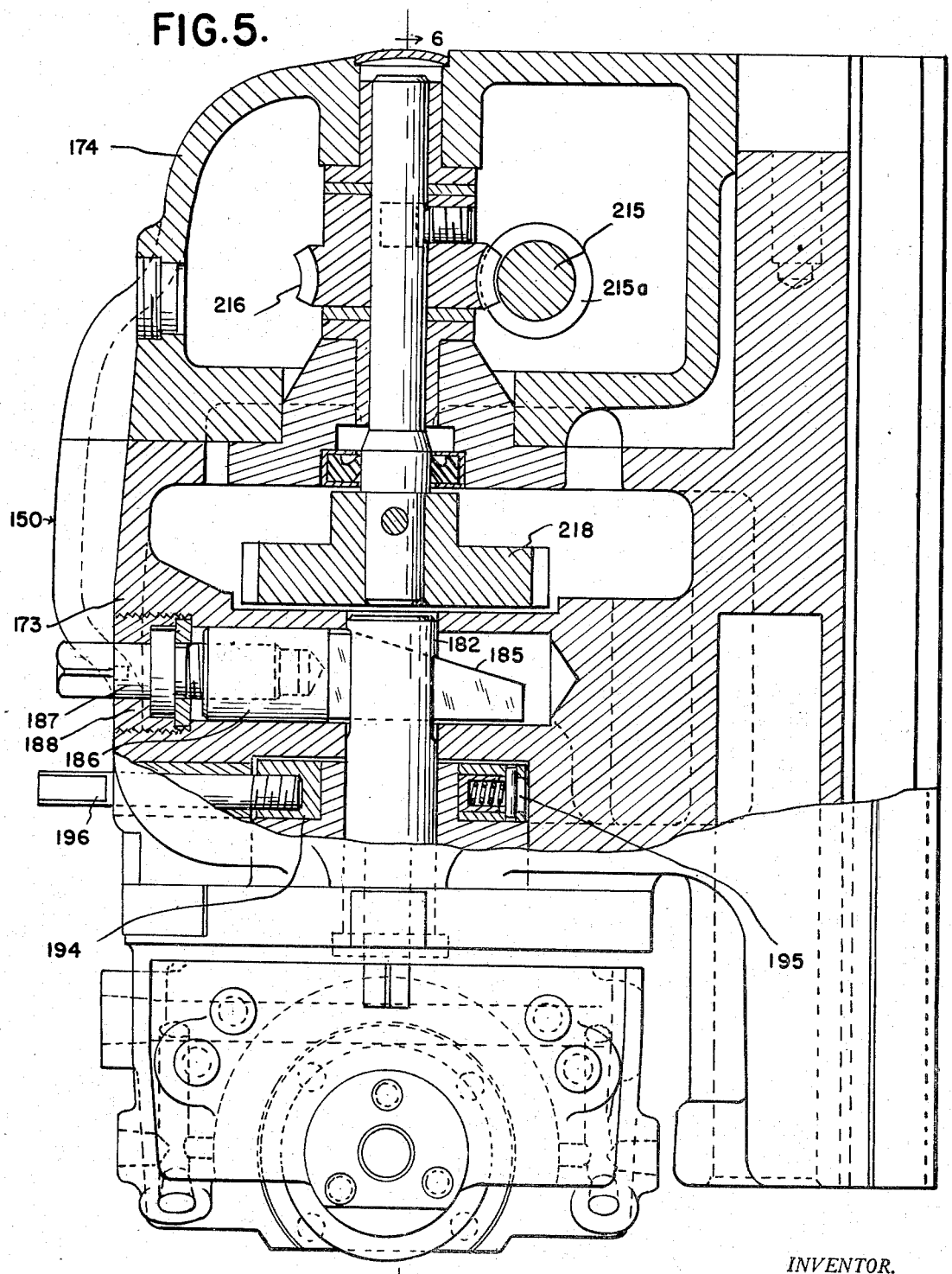

Oct. 23, 1945.                W. S. PRAEG                2,387,679
                          GEAR SHAVING MACHINE
                    Filed March 16, 1942        5 Sheets-Sheet 5
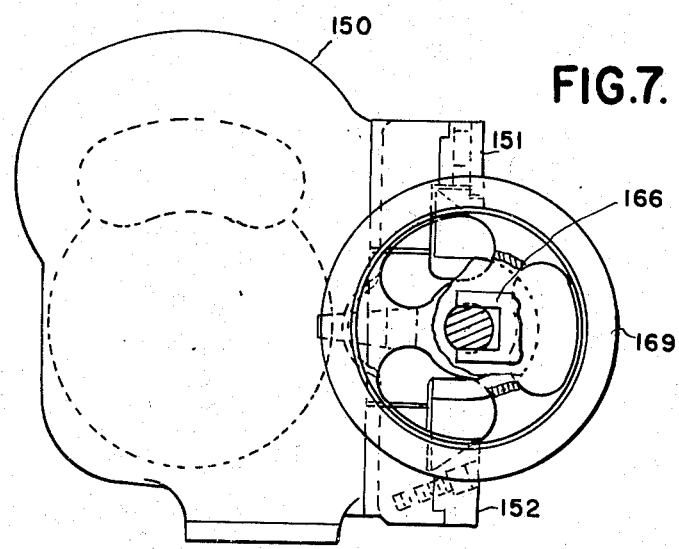
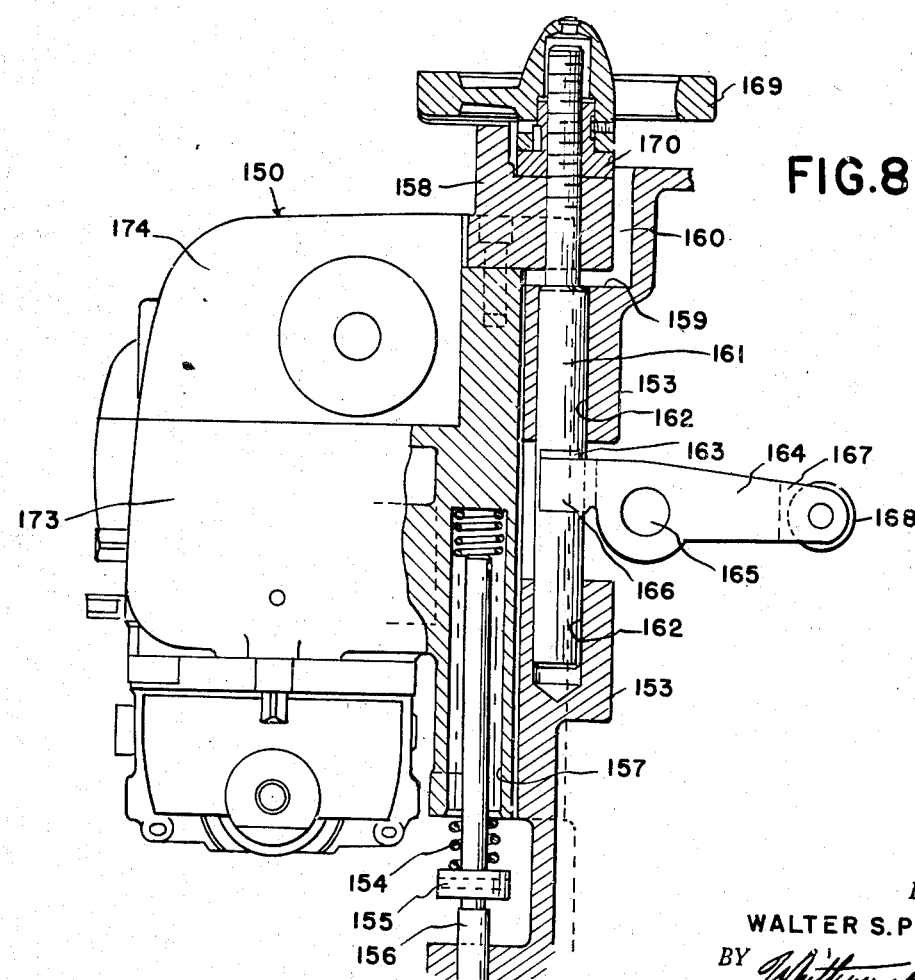
INVENTOR.
WALTER S. PRAEG
BY
ATTORNEYS Patented Oct. 23, 1945

2,387,679

UNITED STATES PATENT OFFICE 2,387,679

GEAR SHAVING MACHINE

Walter S. Praeg, Detroit, Mich., assignor to National Broach & Machine Company, Detroit, Mich., a corporation of Michigan Application March 16, 1942, Serial No. 434,937

14 Claims. (Cl. 90—1.6)

The present invention relates to a gear finishing machine adapted to machine the teeth of a gear by rolling it in mesh at crossed axes with a gearlike tool, while providing a relative reciprocation between the gear and tool in a plane parallel to the axes of the gear and tool. At the same time the relative infeed radially of the gear is provided to machine the teeth of the gear to the desired depth.

Machines of this type are now well known and are adapted to perform the finishing operation referred to in an efficient manner. The present machine involves certain simplifications which permit production of the machine in a small size capable of finishing gears of relatively small diameter.

While reference is made to the fact that the machine illustrated herein may be produced in small sizes, it will be appreciated that such need not be the case, and that a machine having the structural features illustrated, may also be of large sizes capable of finishing relatively large gears. Certain features of construction result in a definitely timed relationship between certain motions of the parts without the necessity of complicating mechanism, and this feature, as well as others, is equally applicable to large as well as to small machines.

It is the object of the present invention to provide a gear finishing machine characterized by the following advantages and structural features: In the first place, the gear finishing machine has a single motor serving as a source of power for effecting rotation of the gear and tool, relative reciprocation between the gear and tool, and the relative feed between the gear and tool radially of the tool. The transmission means between the motor and the various parts are so related that the relative feed of the tool is definitely tied up to the relative reciprocation between the gear and tool. The relative feed referred to is provided by means of a rotary cam operable to effect relative feed between the supports and acting against a resilient means. Electrical control of the motor is tied up with a circuit controlling member rotatable with the rotary cam so that a complete gear finishing cycle corresponds to a single rotation of the cam. The transmission means between the rotary cam and the means for reciprocating the table is definitely correlated so that a whole number of relative reciprocations will be completed upon completion of a single rotation of the cam.

Other objects of the invention will be apparent as the description proceeds and when taken in conjunction with the accompanying drawings, wherein:

Figure 5 is a side elevation of a modified form of tool supporting head, with parts broken away;

Figure 7 is a top plan view of the tool supporting head shown in Figures 5 and 6, with parts broken away; and Figure 8 is a side elevation of the same tool supporting head, with parts broken away, showing a portion of the supporting frame.

Figure 1:
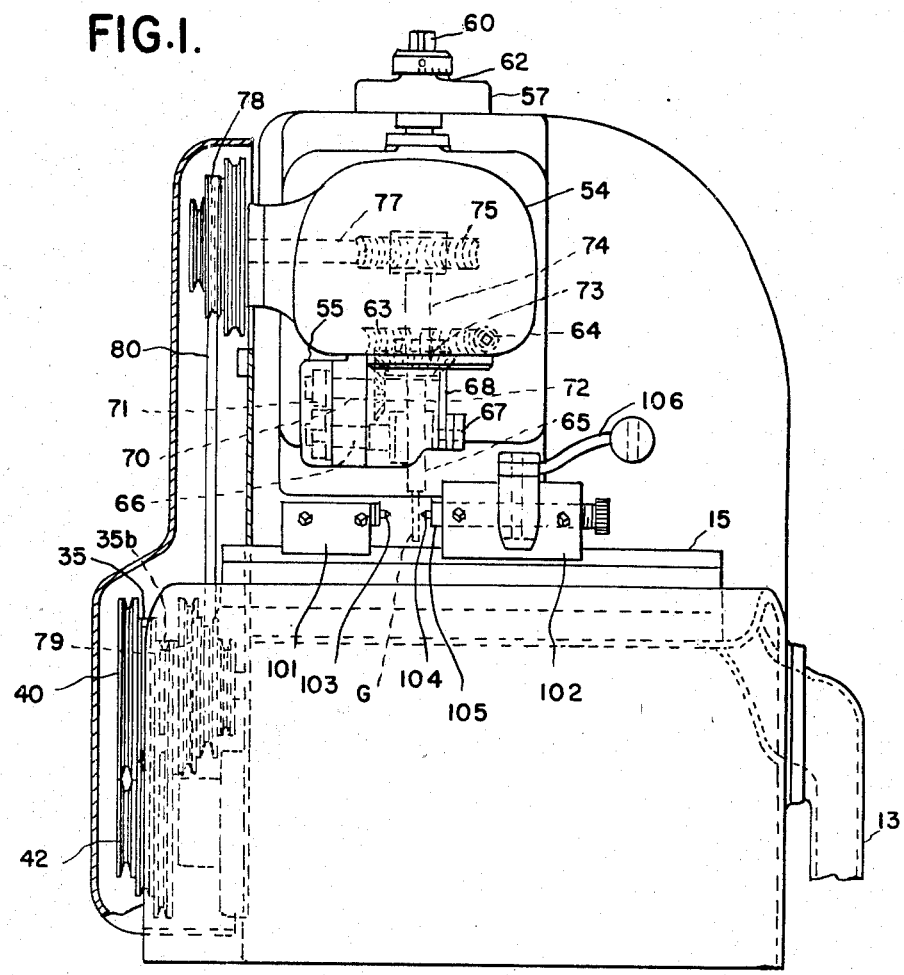
Figure 1 is a front elevation of the improved gear finishing machine.
Figure 2:
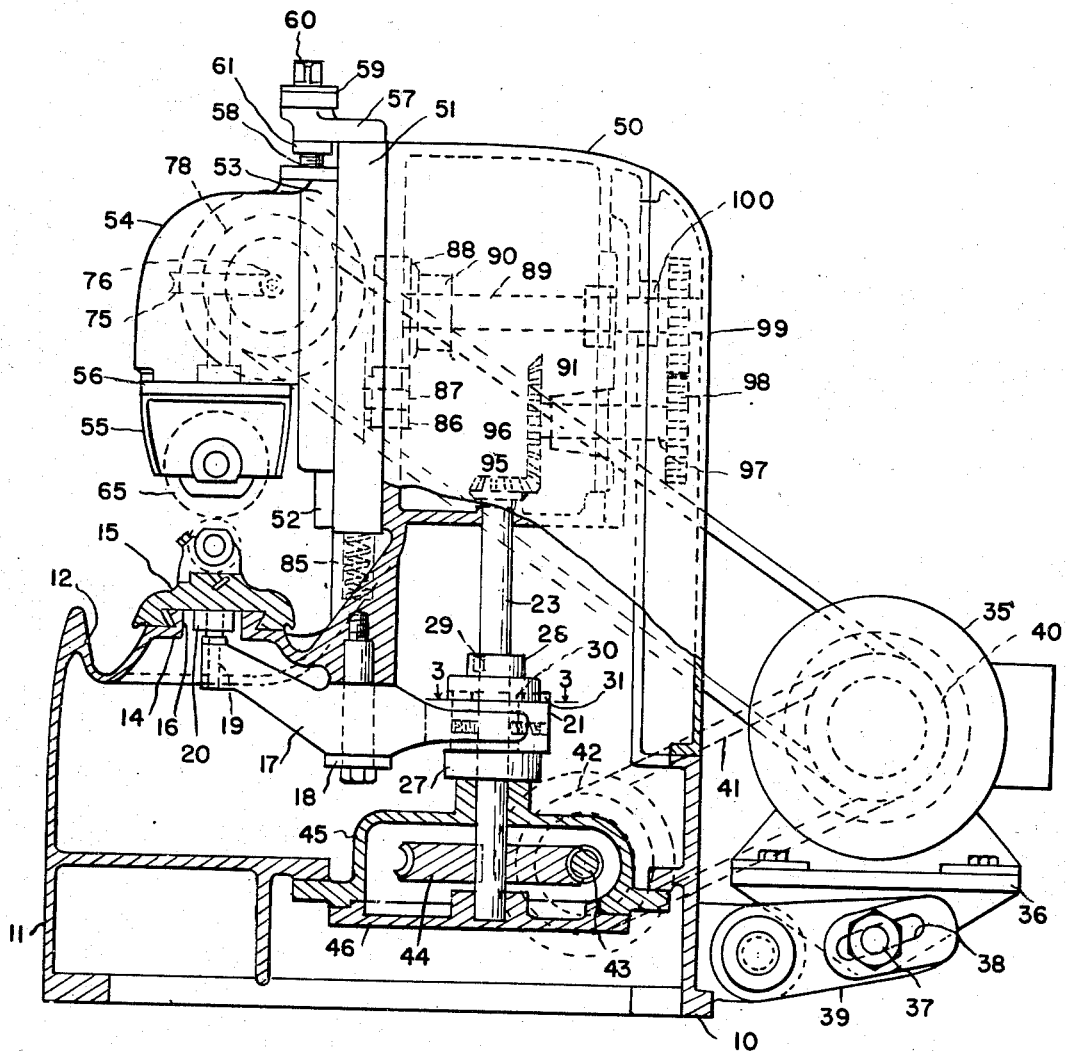
Figure 2 is a side elevation of the machine, with parts broken away.

Referring first to Figures 1 and 2, the machine comprises a main frame 10 having a forwardly projecting shelf or ledge 11. The shelf or ledge 11 is formed at its upper surface, as indicated at 12, to provide a drainage for coolant and as seen in Figure 1, this coolant drains downwardly through an outlet 13 to a suitable reservoir. This projecting ledge 11 is provided with horizontal ways indicated at 14 for supporting a work carriage 15. An opening indicated generally at 16 is provided in the ways for receiving a portion of the driving connections for reciprocating the carriage 15 on the ways 14.

The means for reciprocating the carriage 15 include a lever 17 which is mounted on the frame 10 by a swivel connection, as indicated at 18, around which the lever 17 pivots. One end of the lever 17 carries a pin 19 which supports a roller 20 receivable between spaced, depending lugs on the bottom of the carriage 15.

Figure 3:
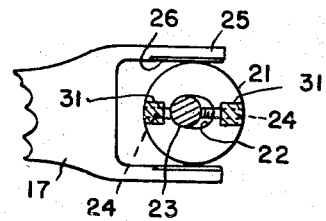
Figure 3 is a section on the line 3—3, Figure 2.

The lever 17 is pivoted about its swivel connection 18 by means of an adjustable eccentric 21, details of which are best seen in Figure 3. The eccentric 21 has an elongated slot 22 therein through which passes a shaft 23. A pair of set screws 24 are threaded into the eccentric 21, the arrangement being such that the heads of the set screws 24 are at all times located beneath the surface of the eccentric 21. As one of the set screws 24 is advanced, the other is retracted with a corresponding adjustment of the eccentric relative to the shaft 23. This adjustment, as will be obvious, is permitted by reason of the elongated slot 22.

The lever 17 is bifurcated to provide arms 25 engaging opposite sides of the eccentric 21, and preferably these arms 25 are provided with hardened wear plates 26. The shaft 23 is provided with a collar 27, which may be either integral with or firmly attached to the shaft 23. The eccentric 21 rests on the collar 27. Above the eccentric 21 is a second collar 28 keyed to the shaft 23, as indicated at 29, and having a downwardly open slot 30 for the reception of upwardly projecting lugs or keys 31 formed as a part of the eccentric 21. Accordingly, rotation of the shaft 23 imparts rotation to the collar 28 through the medium of key 29, and rotation of the collar 28 imparts rotation to the eccentric 21 through the medium of the slot 30 and keys 31.

A motor 35 is mounted on an adjustable plate 36, adjustment of the plate being provided for the purpose of tensioning the drive belts, later to be referred to. The plate 36 is clamped in position by means of bolts 37 received in elongated slots 38 formed in a supporting bracket 39.

The motor 35 drives a set of stepped cone pulleys 40, one of which carries a belt 41 which connects to one of a set of stepped cone pulleys 42. The pulleys 42 are keyed or otherwise suitably connected to a shaft 43 having worm teeth formed on a portion thereof. The shaft 23, previously referred to, has keyed or otherwise secured thereto a worm gear 44 adapted to be driven by the worm portion of the shaft 43. A suitable housing 45 for the worm and worm gear is provided, having a removable bottom closure 46, as seen in Figure 2.

The frame 10 is provided with a vertical column portion 50 having suitable vertically extending guiding ways on the front face thereof for receiving a tool slide 51. The tool slide 51 in turn is provided with suitable vertical ways 52 on its front face for receiving an auxiliary slide 53. The auxiliary slide 53 carries a tool supporting head 54. At the lower portion of the head 54 is provided an angularly adjustable tool support 55. The angularly adjustable support 55 is mounted for adjustment about a vertical axis relative to the head 54, and for effecting fine adjustments, cooperating vernier scales are provided, as indicated at 56. In order to effect these fine adjustments, the head 54 is provided with an adjusting worm gear 63, cooperating with an adjusting worm 64 carried by the head 54. The tool support 55 may then be clamped in adjusted position by suitable means, not shown.

In order to effect vertical adjustment of the auxiliary slide 53 and the tool supporting head 54 relative to the tool slide 51, the following structure is provided: Adjacent the top of the tool slide 51 is provided a supporting bracket 57 which projects over the auxiliary slide 53. An adjusting bolt 58 is mounted in the bracket 57, the bolt having a supporting collar 59 and being provided with a squared upper end 60 for engagement by a suitable tool or wrench. Means 61 are provided for retaining the bolt 58 against vertical movement relative to the bracket 57. The threaded portion of the bolt 58 is received within a suitable tapped opening in the auxiliary slide 53, so that rotation of the bolt 58 effects vertical adjustment of the auxiliary slide and head relative to the tool slide 51. A suitable scale indicated at 62 in Figure 1 is provided to facilitate setting at the desired position.

As best seen in Figure 1, the tool support is adapted to rotatably support a gear finishing tool 65 and for this purpose suitable tool supporting means are provided on a shaft 66 which is supported at its outboard end by a journal 67 in a removable plate 68. The tool support 55 is also provided with a second shaft 70 parallel to the shaft 66 and the shafts are interconnected by change gears indicated generally at 71. The shaft 70, at the end opposite to its change gears, is provided with a bevel gear 72 which meshes with a driving bevel gear 73 keyed or otherwise secured to a shaft 74. The shaft 74 is driven through the medium of a worm gear 75 and a worm portion 76 of a shaft 77 which carries a set of stepped pulleys 78.

The motor 35 is provided with a second set of stepped pulleys 79 and a belt 80 interconnects suitable ones of the pulleys of the sets 78 and 79. It will be appreciated that by shifting the belts from one set of pulleys to the other, variable speeds may be obtained.

From the foregoing, it will be seen that operation of the motor 35 results in rotation of a tool 65 through the medium of pulleys 78, the worm portion 76 of shaft 77, worm wheel 75, bevel gears 73, 72, change gears 71, and shaft 66.

In order to provide a relative feeding motion between the gear and tool the tool slide 51 is mounted for vertical feeding movement in the ways provided on the forward face of the column 50. Suitably mounted in a recess in the column 50 is a strong compression spring 85 bearing against the lower portion of the tool slide 51 and biasing the same upwardly. Extending from the rear of the tool slide 51 is a roller 86 carried by a pin 87. A cam 88 is mounted on the shaft 89 which is supported in bearings 90 and 91. The cam 88 has the profile shown in exaggerated condition in Figure 4. Starting at the point $a$ the cam has a continuous rise to the point $b$. Following around the cam in a clockwise direction from the point $b$ to the point $c$ the cam has a circular cam surface concentric with the center of rotation of the cam from the point $c$ to the point $a$. At point $c$ the cam surface has a low portion 89a which may conveniently be formed by cutting away the cam from the point $c$ to the point $a$, so that the low portion of the cam surface is a straight line. The cam 88 in Figure 4 has been superimposed over a circle, shown in dotted lines, for purposes of comparison.

Rotation is imparted to the cam from the shaft 23 through bevel gears 95, 96, shaft 97, change gears 98 and 99, to the shaft 89 previously referred to. It is to be noted that a positive driving connection is thus provided between the shaft 23 and the cam 88, as well as between the shaft 23 and the work carriage 15. This is an important feature of the present invention since it provides an arrangement whereby reciprocation of the carriage 15 may be brought to rest upon completion of a machine cycle as determined by a single rotation of the cam 88. Thus in Figure 2, if the bevel gears 95, 96 have a 1–2 ratio and if the change gears 98 and 99 have a 1–1 ratio, it will be apparent that the shaft 23 will make two rotations while the shaft 89 makes a single rotation. Two rotations of the shaft 23 results in two complete reciprocations (four strokes) of the work carriage 15.

The motor 35 is provided with a plugging relay 100 which is adapted to be actuated by a cam or projection carried by the shaft 89. Thus when the shaft 89 completes one rotation, the motor is brought to an abrupt stop. In order to restart the motor, a starting switch is provided which will be held depressed long enough for the plugging relay 100 to be released by its actuator. The arrangement of parts is such that when the motor 35 is plugged, the low portion 89ª of the cam 88 is engaged by the roller 86, or, in other words, the roller 86 occupies the position shown in Figure 4 with respect to the cam 88 in the starting position. As seen in this figure, rotation of the cam is counterclockwise.

When a gear has been mounted in position on the work carriage 15 by means later to be described, the tool 65 will be in its uppermost position, which will represent a condition of loose mesh between the gear and the tool 65. If the starting switch is now depressed, the motor starts and the tool 65 is positively rotated by means previously described. At the same time the shaft 23 commences to rotate and the work carriage 15 commences to reciprocate on the ways 14. Simultaneously, rotation is imparted to the cam 88 with the result that as the follower or roller 86 reaches the point a, the tool slide 51 will be moved relatively rapidly downwardly, bringing the gear and tool into a condition of tight mesh. Further rotation of the shaft 23 results in continued reciprocation of the work carriage 15 and in a gradual down feed of the tool 65, as the cam rotates so that the roller 86 follows along the cam from the point a to the point b. When the point b of the cam engages the roller 86, radial feed is terminated and the tool slide 51 remains stationary during the next 90° of movement of the cam 88. This 90° of movement is sufficient to complete a relative translation between the gear and tool without infeed, so that it results in finishing the teeth of the gear to uniform diameter from end to end.

It will be appreciated, of course, that the cam contour can be selected as desired, and may provide different types of feed. Thus instead of providing for a gradual feed during a little more than the first half of rotation, it may be provided with abrupt rises, so that a stepped feed is obtained. However, the present arrangement is preferred and will result in uniformly finished gear teeth as set forth. With the foregoing construction, it is possible to obtain a very flexible operation, since cams 88 may be designed as desired and by reason of change gears 98 and 99, the number of complete reciprocations to a cycle may be varied as desired. In all cases, however, the change gears will be provided in sets such that termination of a complete reciprocation of the work carriage 15 coincides with a complete rotation of the cam 88 as determined by actuation of the plugging relay 100.

Referring now to Figure 1, I have indicated the means for supporting the work piece or gear G. These means comprises a tailstock 101 mounted for adjustment longitudinally on the work carriage 15, and a headstock 102 likewise mounted for longitudinal adjustment on the work carriage 15. The tailstock 101 is provided with a center 103, preferably provided with substantially frictionless ball bearings, as is the center 104 of the headstock 102. Means are provided for preventing too great pressure between the centers 103 and 104, and comprises a spring pressed support 105 for the center 104. The headstock 102 is provided with an operating handle 106 adapted to retract the center 104 and its support 105, but when the operating handle 106 is turned in the other direction, it merely releases the support 105 for movement under the influence of a compression spring, not shown. By this means small gears of little strength are always subjected to a predetermined pressure between the support centers 103 and 104, irrespective of forces applied to the handle 106. Continued movement of the handle 106, however, results in clamping the support 105 in forward position so as to prevent accidental release of the gear G during the stresses of the machining operation.

Figure 4:
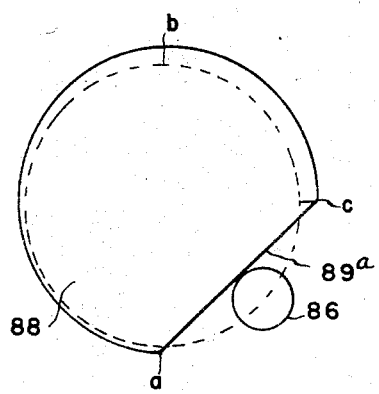
Figure 4 is a view of the feed controlling cam with the camming surfaces exaggerated for clarity.

The tool supporting structure shown in Figures 5 to 8 is intended to be substituted for that shown in Figures 1 and 4, only minor changes in the remaining structure being involved. As best seen in Figure 7, a tool drive housing 150 is provided with guiding gibs 151 and 152 for guiding the housing for vertical motion on a portion of the main supporting frame, which in these figures is indicated at 153. Means are provided for constantly biasing the tool supporting structure upwardly and include a strong compression spring 154 which seats against a flange 155 formed on a rod 156. The tool drive housing 150 is provided with an elongated, bored opening 157 into which the upper end of the rod 156 projects. The upper end of the compression spring 154 seats against the bottom of the hole 157. The spring 154 of sufficient strength to completely balance the weight of the tool supporting structure and to positively bias the same upwardly, thereby removing all backlash from screw to cam.

Secured to the upper end of the tool drive housing 150 is a bracket 158 which overhangs a ledge 159 provided by a recess 160 formed in the frame 153. Adjustably mounted in the bracket 158 is a rod 161 which extends through spaced guiding openings 162 formed in the frame 153. Intermediate the openings 162 is a space in the frame and the shaft 161 at this point is flattened, as indicated at 163, providing shoulders. Suitably secured in the frame is a lever 164 which is mounted for rocking movement on a shaft 165 and is bifurcated, as best seen in Figure 7 at 166. The legs of the bifurcation straddle the flattened portion 163 of the shaft 161 and bear against the lowermost shoulders provided by the flattened portion. The opposite end of the lever 164 is also bifurcated as indicated at 167, and carries a roller 168 which engages a feed controlling cam similar to the cam 88 shown in Figure 2.

At the upper end of the shaft 161 is a handwheel 169. Secured to the handwheel 169 is a feed nut 170, the lower portion of which bears against the upper surface of the bracket 158. The shaft 161 is provided from turning by reason of the flat portions 163 and accordingly rotation of the handwheel 169 and the nut 170 results in effecting vertical adjustment of the shaft 161 relative to the tool drive housing 150.

Upward movement of the tool drive housing 150 under the influence of the spring 154 is prevented by virtue of the engagement between the bifurcation 166 of the lever 164 and the lower shoulders provided on the shaft 161 by the flattened portions 163. Accordingly, as the cam which engages the roller 168 rotates, the entire tool supporting structure including the tool drive housing 150 moves upwardly and downwardly in a manner controlled by the contour of said cam. In order to effect variations in the upward and downward movement of the tool supporting structure, the handwheel 169 is rotated. This will accommodate the tool supporting structure to different size gears, for example.

The tool drive housing 150 includes a main casting 173 and a removable cover plate 174. Secured adjacent the lower end of the tool drive housing 150 is a tool support 175, which will now be described in detail.

The lower end of the casting 173 is provided with a web 176 which is formed into a recessed boss 177 provided with an opening therethrough, as indicated at 178. The opening 178 is provided with a portion of greater diameter, as indicated at 179, adjacent its lower end and is adapted to receive an upwardly projecting, cylindrical boss 180 formed on the tool support 175. The boss 180 is provided with an opening extending therethrough, as indicated at 181, which, in turn, receives a supporting pin 182. The pin 182 has a lowermost head 183 seated in an appropriately shaped recess in the tool support 175.

The upper surface of the tool support 175 engages the downwardly facing, corresponding surfaces on the web 176, and this arrangement is taken advantage of in effecting locking engagement between the tool support 175 and the tool drive housing 150. The pin 182 is provided with a transverse opening 184 through which extends a tapered wedge 185 formed on an adjustable plunger 186. The plunger 186 has threaded thereto an adjusting screw 187 which is held against longitudinal movement in the main casting 173 of the tool drive housing 150 by means of a threaded plug 188.

It will be apparent that when the adjusting screw 187 is turned in a direction to move the wedge portion 185 to the right, as seen in Figure 5, this will have the effect of raising the pin 182 and therefore will draw the tool support 175 upwardly so that its uppermost horizontal surface will clampingly engage and interlock with the lower horizontal surfaces of the web 176.

Means are provided for effecting swivel adjustment of the tool support 175 with respect to the tool drive housing 150, and includes a circular rack portion 190 on the tool support 175 which is meshed with a pinion 191 mounted for rotation in the main casting 173 of the tool drive housing 150. The pinion 191 is provided with a squared portion 192 for engagement by a suitable tool for effecting swivel adjustment of the tool support 175 when its clamping engagement with the tool drive housing is released.

In order that the swivel adjustment of the tool support 175 may be set with a great degree of accuracy, the following structure is provided: The boss 180 formed at the upper portion of the tool support 175 is cut away to provide a circular seat for a slip ring 194. The slip ring 194 is provided with two spring pressed friction elements 195, one of which is clearly illustrated in Figure 5. These elements are preferably provided at points spaced apart by 120°, and at the other 120° point on the ring 194 is provided an indicator post 196. The indicator post 196 extends outwardly through a horizontal elongated opening provided in the main casting 173 of the tool drive housing 150. The arrangement is such that when the tool support 175 is swiveled to a substantial angle, the indicator post 196 will engage one end of the slot and thereafter the slip ring 194 will remain stationary while the tool support 175 continues its swiveling motion. When an approximate set has been reached the indicator post 196 may be manually moved to an intermediate position in its slot, and thereafter fine adjustments may be made and read, using the conventional type of indicator.

Figure 6:
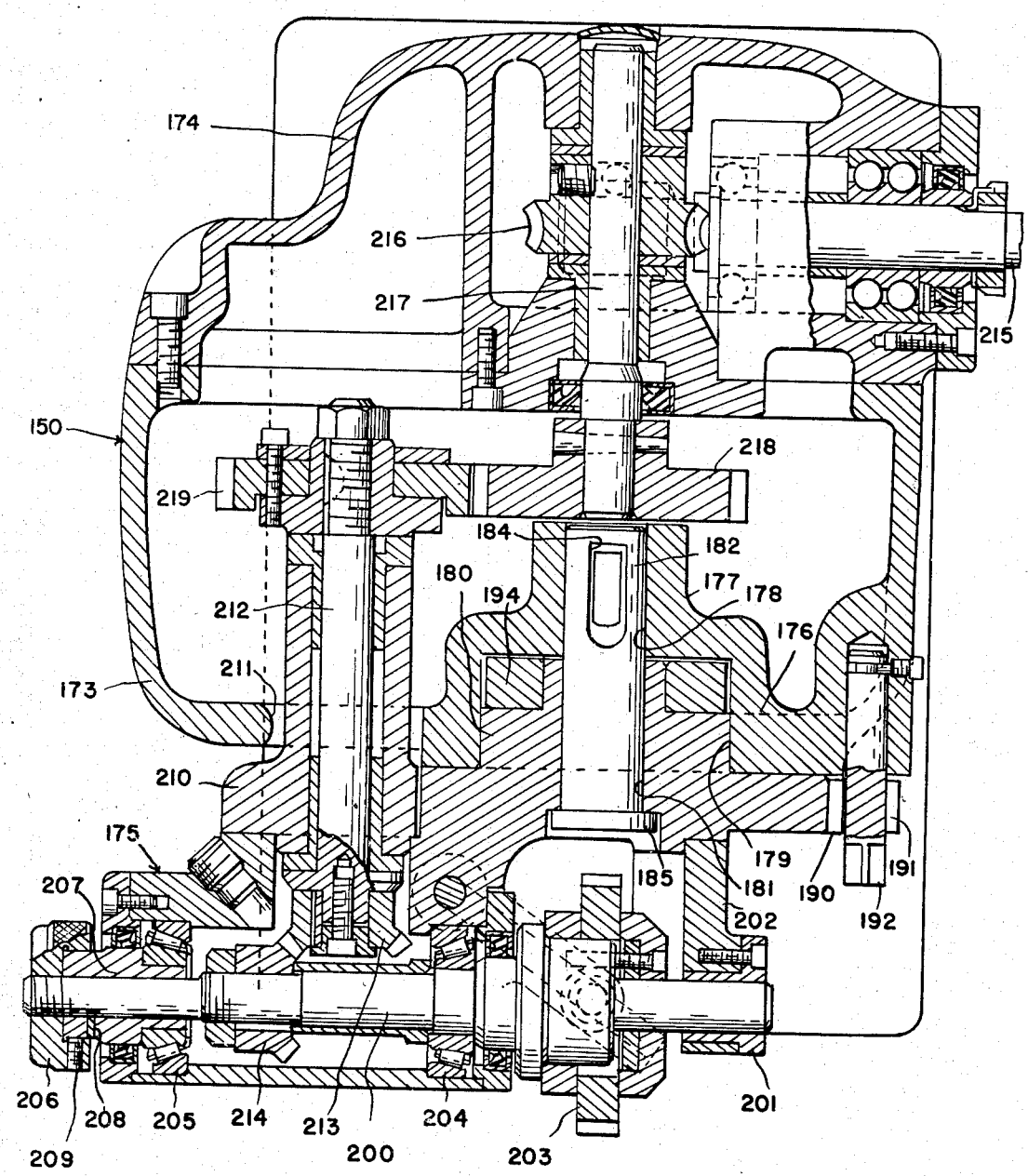
Figure 6 is a section on the line 6—6, Figure 5.

The tool support 175 includes a tool drive spindle 200, the outboard end of which is supported by a bushing 201 carried by a removable plate 202. The plate 202 is removable to give access to the spindle 200 and releasing the gear finishing tool indicated at 203. Suitable bearings 204 and 205 are provided for mounting the spindle 200 and, as best seen in Figure 6, the spindle extends outwardly beyond the bearing 205 and has secured thereto a knurled nut 206 by means of which the spindle bearings may be tightened, in order to take up any play which develops. For this purpose, block 207, which carries the inner race for bearing 205, is keyed, as shown at 208, to spindle 200, and nut 206 has a set screw 209 which may be loosened to permit adjustment of the bearings.

Extending upwardly into the interior of the main casting 173 is a column 210. An elongated opening 211 is provided in the casting 173, which permits movement of the column 210 in an arcuate path about the center of the swivel, as determined by the axis of the pin 182. Mounted in the column 210 is a shaft 212 carrying a bevel gear 213 at its lower end which meshes with a second bevel gear 214, keyed or otherwise secured to the tool spindle 200.

The drive for the tool spindle 200 originates in the same motor which rotates the feeding cam and which reciprocates the work carriage, all as fully described in connection with Figures 1 to 4. The drive for the tool spindle includes a shaft 215 mounted in the tool supporting housing and terminating in a worm portion 215a which meshes with a worm gear 216 secured to the shaft 217. The shaft 217 is coaxial with the pin 182, and accordingly when the tool support 175 is swiveled, it swivels about the axis of the shaft 217.

Secured to the lower end of the shaft 217 is a driving gear 218 which meshes with a gear 219 carried by the shaft 212. Accordingly, swivel adjustment of the tool support 175 about the axis of the pin 182 is permitted without modifying the driving connections between the shaft 215 and the tool spindle 200.

The operation of the modified tool supporting structure illustrated in Figures 5 to 8 is in general the same as that described in the modification illustrated in Figures 1 to 4. In both cases a single motor is employed which rotates the tool spindle, reciprocates the work carriage horizontally and moves the tool support downwardly in timed relation to reciprocation of the work support. In both cases also the timing arrangement is such that a complete rotation of the cam which effects the downward and upward movement of the tool support corresponds to a complete cycle of the machine and terminates in moving the tool supporting structure upwardly into a position of loose mesh.

Attention is directed to the fact that the upper and downward movement of the tool supporting structure is strictly limited in amount. In other words the uppermost position of the tool supporting spindle corresponds to a condition of loose mesh between a gearlike tool carried thereby and a work gear mounted on the work support. The initial, substantial downward movement of the tool support moves the tool downwardly into a position of tight mesh, and further gradual movement corresponds to a controlled feeding of the tool into the work. The cycle is terminated by an upward movement of the tool to a position of loose mesh, in which position it is possible to remove the finished gear and to substitute a new work gear therefor.

This limited movement of the tool spindle upwardly and downwardly brings about two important results. In the first place, it reduces the over-all size of the machine, which is an important consideration in the present case since the machine is intended for use on small gears. In the second place, this results in a condition in which the tool and work gear when positioned between centers, are never out of mesh.

While I have illustrated and described with some particularity two preferred embodiments of my gear finishing machine, it will be understood that the same has been done only to enable those skilled in the art to practice the invention, the scope of which is indicated by the appended claims.

What I claim as my invention is:

1. A gear finishing machine comprising a work carriage mounted for reciprocation, a tool slide movable toward and away from said work carriage, resilient means urging said tool slide away from said work carriage, a rotatable cam for controlling movement of said tool slide, a cam follower on said tool slide, an eccentric for effecting reciprocation of said carriage, a motor and connections between said motor and said cam and between said motor and said eccentric for effecting timed movement of said slide with relation to reciprocation of said carriage.

2. A gear finishing machine comprising a work carriage mounted for reciprocation, a tool slide movable toward and away from said work carriage, resilient means urging said tool slide away from said work carriage, a rotatable cam for controlling movement of said tool slide, a cam follower on said tool slide, said cam having a low portion corresponding to loading position for said tool slide, a progressive rise portion for feeding said tool slide toward said work carriage, and a dwell portion for holding said tool slide stationary, an eccentric for effecting reciprocation of said carriage, a motor and connection between said motor and said cam and between said motor and said eccentric for effecting timed movement of said slide with relation to reciprocation of said carriage.

3. A gear finishing machine comprising a work carriage mounted for reciprocation, a tool slide movable toward and away from said work carriage, resilient means urging said tool slide away from said work carriage, a rotatable cam for controlling movement of said tool slide, a cam follower on said tool slide, said cam having a low portion corresponding to loading position for said tool slide, a progressive rise portion for feeding said tool slide toward said work carriage, and a dwell portion for holding said tool slide stationary, an eccentric for effecting reciprocation of said carriage, a motor, connection between said motor and said cam and between said motor and said eccentric for effecting timed movement of said slide with relation to reciprocation of said carriage, and an electrical control element movable with said cam and operable to stop said motor when said low portion of said cam is engaging said follower to terminate a machine cycle.

4. A gear finishing machine comprising a work carriage mounted for reciprocation, a tool slide movable toward and away from said work carriage, resilient means urging said tool slide away from said work carriage, a rotatable cam for controlling movement of said tool slide, a cam follower on said tool slide, said cam having a low portion corresponding to loading position for said tool slide, a progressive rise portion for feeding said tool slide toward said work carriage, and a dwell portion for holding said tool slide stationary, an eccentric for effecting reciprocation of said carriage, a motor, connection between said motor and said cam and between said motor and said eccentric for effecting timed movement of said slide with relation to reciprocation of said carriage, and an electrical control element movable with said cam and operable to stop said motor when said low portion of said cam is engaging said follower to terminate a machine cycle, one of said connections between said motor and said eccentric on said cam including change gears whereby to vary the number of strokes of said carriage in a cycle.

5. A gear finishing machine comprising a frame, a work carriage slidable on said frame, a lever pivoted to said frame and connected to said carriage, an eccentric rotatable on said frame, and means on said lever engaging said eccentric to effect reciprocation of said carriage upon rotation of said eccentric; a tool slide movable on said frame toward and away from said carriage, means biasing said slide away from said carriage, a cam rotatable on said frame, a cam follower on said slide, said cam being shaped to provide a progressive feed of said slide toward said carriage, a dwell of said slide, and a relatively abrupt and substantial movement of said slide away from said carriage; a motor carried by said frame, a shaft driven by said motor, positive driving connections between said shaft and said eccentric, positive driving connections between said shaft and said cam, said positive driving connections being such as to cause completion of a reciprocation of said carriage upon completion of a single rotation of said cam.

6. A gear finishing machine comprising a frame, a work carriage slidable on said frame, a lever pivoted to said frame and connected to said carriage, an eccentric rotatable on said frame, and means on said lever engaging said eccentric to effect reciprocation of said carriage upon rotation of said eccentric; a tool slide movable on said frame toward and away from said carriage, means biasing said slide away from said carriage, a cam rotatable on said frame, a cam follower on said slide, said cam being shaped to provide a progressive feed of said slide toward said carriage, a dwell of said slide, and a relatively abrupt and substantial movement of said slide away from said carriage; a motor carried by said frame, a shaft driven by said motor, positive driving connections between said shaft and said eccentric, positive driving connections between said shaft and said cam, said positive driving connections being such as to cause completion of a reciprocation of said carriage upon completion of a single rotation of said cam, and change gears in one of said positive driving connections to vary the number of reciprocations of said carriage completed, upon completion of a single rotation of said cam.

7. A gear finishing machine comprising a frame, a work carriage slidable on said frame, a lever pivoted to said frame and connected to said carriage, an eccentric rotatable on said frame, and means on said lever engaging said eccentric to effect reciprocation of said carriage upon rotation of said eccentric; a tool slide movable on said frame toward and away from said carriage, means biasing said slide away from said carriage, a cam rotatable on said frame, a cam follower on said slide, said cam being shaped to provide a progressive feed of said slide toward said carriage, a dwell of said slide, and a relatively abrupt and substantial movement of said slide away from said carriage; a motor carried by said frame, a shaft driven by said motor, positive driving connections between said shaft and said eccentric, positive driving connections between said shaft and said cam, said positive driving connections being such as to cause completion of a reciprocation of said carriage upon completion of a single rotation of said cam, and change gears in one of said positive driving connections to vary the number of reciprocations of said carriage completed, upon completion of a single rotation of said cam, and electrical control means operated upon completion of a single rotation of said cam for shutting off said motor.

8. A gear finishing machine comprising a frame, a work carriage slidable on said frame, an eccentric rotatable on said frame, and means engaging said eccentric to effect reciprocation of said carriage upon rotation of said eccentric; a tool slide movable on said frame toward and away from said carriage, means biasing said slide away from said carriage, a cam rotatable on said frame, a cam follower on said slide, said cam being shaped to provide a progressive feed of said slide toward said carriage, a dwell of said slide, and a relatively abrupt and substantial movement of said slide away from said carriage; a motor carried by said frame, a shaft driven by said motor, positive driving connections between said shaft and said eccentric, positive driving connections between said shaft and said cam, said positive driving connections being such as to cause completion of a reciprocation of said carriage upon completion of a single rotation of said cam.

9. A gear finishing machine comprising a frame, a work carriage slidable on said frame, an eccentric rotatable on said frame, and means engaging said eccentric to effect reciprocation of said carriage upon rotation of said eccentric; a tool slide movable on said frame toward and away from said carriage, means biasing said slide away from said carriage, a cam rotatable on said frame, a cam follower on said slide, said cam being shaped to provide a progressive feed of said slide toward said carriage, a dwell of said slide, and a relatively abrupt and substantial movement of said slide away from said carriage; a motor carried by said frame, a shaft driven by said motor, positive driving connections between said shaft and said eccentric, positive driving connections between said shaft and said cam, said positive driving connections being such as to cause completion of a reciprocation of said carriage upon completion of a single rotation of said cam, and change gears in one of said positive driving connections to vary the number of reciprocations of said carriage completed, upon completion of a single rotation of said cam.

10. A gear finishing machine comprising a frame, a work carriage slidable on said frame, an eccentric rotatable on said frame, and means engaging said eccentric to effect reciprocation of said carriage upon rotation of said eccentric; a tool slide movable on said frame toward and away from said carriage, means biasing said slide away from said carriage, a cam rotatable on said frame, a cam follower on said slide, said cam being shaped to provide a progressive feed of said slide toward said carriage, a dwell of said slide, and a relatively abrupt and substantial movement of said slide away from said carriage; a motor carried by said frame, a shaft driven by said motor, positive driving connections between said shaft and said eccentric, positive driving connections between said shaft and said cam, said positive driving connections being such as to cause completion of a reciprocation of said carriage upon completion of a single rotation of said cam, a work spindle on said carriage, a tool spindle on said slide, and drive means connecting said motor to one of said spindles.

11. A gear finishing machine comprising a frame, a work carriage slidable on said frame, an eccentric rotatable on said frame, and means engaging said eccentric to effect reciprocation of said carriage upon rotation of said eccentric; a tool slide movable on said frame toward and away from said carriage, means biasing said slide away from said carriage, a cam rotatable on said frame, a cam follower on said slide, said cam being shaped to provide a progressive feed of said slide toward said carriage, a dwell of said slide, and a relatively abrupt and substantial movement of said slide away from said carriage; a motor carried by said frame, a shaft driven by said motor, positive driving connections between said shaft and said eccentric, positive driving connections between said shaft and said cam, said positive driving connections being such as to cause completion of a reciprocation of said carriage upon completion of a single rotation of said cam, a work spindle on said carriage, an auxiliary slide adjustable on said tool slide toward and away from said carriage to accommodate various sizes of gears, a tool spindle angularly adjustable on said auxiliary slide, and drive means connecting said motor and one of said spindles.

12. In a gear shaving machine, a frame, a work support on said frame, a tool support slidably mounted on said frame for movement toward and away from said work support, resilient means biasing said tool support away from said work support, an adjustable abutment carried by said tool support, a lever engaging said abutment, a cam engaging and controlling the movement of said lever, and drive means for simultaneously rotating said cam and translating said table in timed relation.

13. In a gear finishing machine, a tool drive housing having a driving gear mounted therein and a supporting web having an opening in alignment with said gear, a tool support, an apertured shaft secured to said tool support and extending into said opening, bearing surfaces between said tool support and web, and wedge means carried by said housing and extending into the aperture of said shaft for effecting clamping engagement between said bearing surfaces.

14. In a gear finishing machine, a tool drive housing having a supporting web provided with an opening therein, a tool support, an apertured shaft secured to said tool support and extending into said opening, bearing surfaces between said tool support and web, and wedge means carried by said housing and extending into the aperture of said shaft for effecting clamping engagement between said bearing surfaces.

WALTER S. PRAEG.